United States Patent
Boelaers et al.

(10) Patent No.: US 10,519,570 B2
(45) Date of Patent: Dec. 31, 2019

(54) FIBER GRADE WITH IMPROVED SPINNING PERFORMANCE AND MECHANICAL PROPERTIES

(71) Applicant: Borealis AG, Vienna (AT)

(72) Inventors: Guido Boelaers, Overpelt (BE); Bert Broeders, Beringen (BE); Joachim Fiebig, St. Marien (AT); Henk Van Paridon, Averbode (BE)

(73) Assignee: BOREALIS AG, Vienna (AT)

( * ) Notice: Subject to any disclaimer, the term of this patent is extended or adjusted under 35 U.S.C. 154(b) by 943 days.

(21) Appl. No.: 14/379,183

(22) PCT Filed: Feb. 15, 2013

(86) PCT No.: PCT/EP2013/053050
§ 371 (c)(1),
(2) Date: Aug. 15, 2014

(87) PCT Pub. No.: WO2013/124219
PCT Pub. Date: Aug. 29, 2013

(65) Prior Publication Data
US 2015/0024650 A1 Jan. 22, 2015

(30) Foreign Application Priority Data
Feb. 24, 2012 (EP) ..................... 12156791

(51) Int. Cl.
*D01F 6/46* (2006.01)
*D01D 5/12* (2006.01)
*D04H 3/007* (2012.01)

(52) U.S. Cl.
CPC ............ *D01F 6/46* (2013.01); *D01D 5/12* (2013.01); *D04H 3/007* (2013.01); *D10B 2321/022* (2013.01); *D10B 2501/04* (2013.01); *D10B 2505/04* (2013.01); *D10B 2509/00* (2013.01); *Y10T 428/298* (2015.01); *Y10T 442/608* (2015.04)

(58) Field of Classification Search
CPC ...... D01F 6/46; C08L 23/10; C08L 2205/025; Y10T 442/608; D10B 2321/022; D04H 3/007
USPC ........................................... 442/401
See application file for complete search history.

(56) References Cited

U.S. PATENT DOCUMENTS

| | | | |
|---|---|---|---|
| 5,529,845 A | 6/1996 | Branchesi et al. | |
| 5,549,867 A * | 8/1996 | Gessner | D01F 6/04 264/211.12 |
| 5,804,304 A * | 9/1998 | Williams | C08F 10/06 428/364 |
| 2003/0083437 A1* | 5/2003 | Bugada | C08L 23/12 525/240 |
| 2004/0249004 A1* | 12/2004 | Coppini | C08J 9/0061 521/56 |
| 2006/0008643 A1* | 1/2006 | Lin | C08K 5/0016 428/364 |
| 2006/0183860 A1* | 8/2006 | Mehta | C08L 23/10 525/191 |
| 2012/0270039 A1* | 10/2012 | Tynys | C08L 23/10 428/338 |

FOREIGN PATENT DOCUMENTS

| | | |
|---|---|---|
| EP | 0552013 A2 | 7/1993 |
| WO | WO-2001094462 A1 | 12/2001 |
| WO | WO-2005-080497 A1 | 9/2005 |
| WO | 2011/058118 A1 | 5/2011 |

OTHER PUBLICATIONS

Cottam et al., "Effect of Molecular Weight Distribution on Melt Flow Properties of Low-Pressure Polyethylene," Journal of Applied Polymer Science, vol. 9, pp. 1853-1862 (1965) (Year: 1965).*
Baker et al. "Conformationofo Ethylene/Propylene Copolymers (Random or Block)as Seen by 13C NMR, IR and Thermal Methods*", Thermochimica Acta, 166 (1990) 53-68.
Berger et al. "200 and More NMR Experiments a Practical Course", 2004.
Busico, et al. "Microstructure of polypropylene" Prog. Polym. Sci. 26 (2001) 443-533.
Search Report for Application No. UAE/P/ 0868/2014, dated Nov. 20, 2018.
Examination Report for for Application No. UAE/P/ 0868/2014, dated Nov. 20, 2018.

* cited by examiner

*Primary Examiner* — Jeremy R Pierce
(74) *Attorney, Agent, or Firm* — Tarolli, Sundheim, Covell & Tummino LLP

(57) ABSTRACT

The present invention is directed to a new polypropylene composition, polypropylene fibres comprising said polypropylene composition, a spunbonded fabric comprising said polypropylene fibres and/or polypropylene composition, an article comprising said polypropylene fibres and/or said spunbonded fabric as well as to a process for the preparation of such spunbonded fabric and the use of such polypropylene composition for improving the stability of a fibre spinning line.

12 Claims, No Drawings

FIBER GRADE WITH IMPROVED SPINNING PERFORMANCE AND MECHANICAL PROPERTIES

The present invention is directed to a new polypropylene composition, polypropylene fibres comprising said polypropylene composition, a spunbonded fabric comprising said polypropylene fibres and/or polypropylene composition, an article comprising said polypropylene fibres and/or said spunbonded fabric as well as to a process for the preparation of such spunbonded fabric and the use of such polypropylene composition for improving the stability of a fibre spinning line.

Today, polypropylene is widely used in many fiber and fabric applications. One important trend over the last decades in the fiber industry has been down-gauging. In nonwoven the main challenge in this regard is to keep the mechanical properties while lowering the basis weight of the prepared fibers. The most effective way to achieve the foregoing is to lower the fiber diameter of the prepared fibers which also result in a higher specific surface area. Such reduction in fiber diameter can be achieved by increasing the take-up speed and by stretching the fibers to a higher degree. An increase of the take-up speed is however limited due to filament breaks occurring in the instant fiber spinning process. In this regard, it is well known to use low-MFR compositions resulting in stronger fibers which should allow higher take-up speeds. However, such low-MFR compositions may affect the processability adversely. On the other side, the use of compositions with higher MFR improves processability but results in fibers with lower strength. To improve the processability of low-MFR compositions additional components may be added, but this measure may also affect the overall fiber characteristics adversely.

It is therefore the object of the present invention to provide a polypropylene composition which enables the preparation of very thin fibres without the risk of filament breaking during the spunbonding process. It is a further object of the present invention that the obtained fibres and fabrics should have a good balance of processability and mechanical properties, i.e. the fibres and fabrics should have mechanical properties that are comparable or even better to those of conventional fibres and fabrics.

The foregoing and other objectives are solved by the subject-matter of the present invention. Advantageous embodiments of the present invention are defined in the corresponding sub-claims.

The finding of the present invention is that very thin fibres are obtainable in case the polypropylene withstands high take-up speeds. A further finding of the present invention is that the polypropylene composition must comprise a polypropylene with a melt flow rate $MFR_2$ (230° C.) in the range of 0.1 g/10 min to 20 g/10 min and additionally a small amount of a further polypropylene having a rather high melt flow rate $MFR_2$ (230° C.), i.e. in the range of 200 g/10 min to 2,500 g/10 min. Furthermore, the polypropylene composition must have a melt flow rate (230° C.) in the range of 10 g/10 min to 60 g/10 min and a polydispersity index (PI) of not more than 4.0.

Accordingly the present invention is directed to a polypropylene composition (PP-C) comprising
  a) at least 80 wt.-%, based on the total weight of the polypropylene composition (PP-C), of a polypropylene (L-PP) homo- or copolymer having a melt flow rate according to ISO 1133 (230° C./2.16 kg) in the range of 0.1 g/10 min to 20 g/10 min and a comonomer content of up to 5 wt.-%, the comonomers are selected from ethylene and/or $C_4$- to $C_{10}$ α-olefin, and
  b) between 2 wt.-% and 20 wt.-%, based on the total weight of the polypropylene composition (PP-C), of a polypropylene (H-PP) homo- or copolymer having a melt flow rate according to ISO 1133 (230° C./2.16 kg) in the range of 200 g/10 min to 2,500 g/10 min and a comonomer content of up to 5 wt.-%, the comonomers are selected from ethylene and/or $C_4$- to $C_{10}$ α-olefin,
wherein the polypropylene composition (PP-C) has a melt flow rate according to ISO 1133 (230° C./2.16 kg) in the range of 10 g/10 min to 60 g/10 min and optionally a polydispersity index (PI) of not more than 4.0, like of not more than 3.8.

The inventors surprisingly found that the foregoing polypropylene composition (PP-C) has superior properties compared to known polypropylene compositions, in particular to those used for fibres prepared in a spunbonding process. The polypropylene composition (PP-C) of the present invention enables in particular the preparation of fibres and fabrics at significantly higher spinning speeds resulting in fibres of smaller diameters, i.e. improves the spinning stability of the process. While the present polypropylene composition improves the processability via enhanced maximum take-up speed, the mechanical properties are comparable to those of conventional fibers and fabrics. In particular, it has been found that mechanical parameters like elongation and tensile strength are practically not affected or are even better to those of conventional fibers and fabrics.

Another aspect of the present invention is directed to a polypropylene fiber (PP-F) having an average filament fineness of not more than 1.50 denier, wherein said fiber (PP-F) comprises at least 95 wt.-%, based on the total weight of the polypropylene fiber (PP-F), of such a polypropylene composition (PP-C).

A still further aspect of the present invention is directed to an article comprising said polypropylene fiber (PP-F) and/or said spunbonded fabric, wherein said article is selected from the group consisting of filtration medium, diaper, sanitary napkin, panty liner, incontinence product for adults, protective clothing, surgical drape, surgical gown, and surgical wear.

A still further aspect of the present invention is directed to the use of said polypropylene composition (PP-C) to improve the spinning stability of a fibre spinning line expressed by the maximum cabin air pressure during the fibre spinning processing, wherein the improvement is defined by the Formula (I)

$$(PP-C)/(PP-OC) \geq 1.1 \tag{I}$$

wherein
(PP-C) is the maximum applicable cabin air pressure [Pa] of the polypropylene composition (PP-C) comprising polypropylene (L-PP) and polypropylene (H-PP),
(PP-OC) is the maximum applicable cabin air pressure [Pa] of the polypropylene composition (PP-C) without the polypropylene (H-PP).

When in the following reference is made to preferred embodiments or technical details of the polypropylene composition, it is to be understood that these preferred embodiments or technical details also refer to the inventive polypropylene fiber, the inventive spunbonded fabric, the inventive article as well as the inventive process for the preparation of a spunbonded fabric and the inventive use. If, for example, it is set out that the polypropylene (L-PP) of the inventive polypropylene composition preferably is a propylene homopolymer, also the polypropylene (L-PP) of the polypropylene composition (PP-C) provided in the inventive polypropylene fiber, the spunbonded fabric, the article as well as the inventive process and inventive use preferably is a propylene homopolymer.

According to one preferred embodiment of the present invention, the polypropylene (L-PP) has a) a melt flow rate according to ISO 1133 (230° C./2.16 kg) in the range of 0.5 g/10 min to 20 g/10 min, and/or b) a melting temperature Tm measured according to ISO 11357-3 of at least 150° C., and/or c) a xylene cold soluble content (XCS) measured according to ISO 6427 (23° C.) of not more than 3.5 wt.-%.

According to another preferred embodiment of the present invention, the polypropylene (H-PP) has a) a melt flow rate according to ISO 1133 (230° C./2.16 kg) in the range of 400 g/10 min to 2,000 g/10 min, and/or b) a melting temperature Tm measured according to ISO 11357-3 of at least 150° C., and/or c) a xylene cold soluble content (XCS) measured according to ISO 6427 (23° C.) of not more than 3.5 wt.-%.

According to yet another preferred embodiment of the present invention, the polypropylene (L-PP) is a propylene homopolymer (HL-PP), and/or the polypropylene (H-PP) is a propylene homopolymer (HH-PP).

According to one preferred embodiment of the present invention, the polypropylene composition (PP-C) comprises at least 90 wt.-%, based on the total weight of the polypropylene composition (PP-C), of polypropylene (L-PP), and between 3 wt.-% and 10 wt.-%, based on the total weight of the polypropylene composition (PP-C), of polypropylene (H-PP).

According to another preferred embodiment of the present invention, the ratio of melt flow rate according to ISO 1133 (230° C./2.16 kg) between the polypropylene (H-PP) and polypropylene (L-PP) [$MFR_2$ (H-PP)/$MFR_2$ (L-PP)] is at least 10 and more preferably at least 20, wherein "$MFR_2$ (H-PP)" is the $MFR_2$ (230° C.) of the polypropylene (H-PP) and "$MFR_2$ (L-PP)" is the $MFR_2$ (230° C.) of the polypropylene (L-PP).

According to yet another preferred embodiment of the present invention, the polypropylene composition (PP-C) has a) a melt flow rate according to ISO 1133 (230° C./2.16 kg) in the range of 15 g/10 min to 60 g/10 min, and/or b) a polydispersity index (PI) in the range of 2.0 to 4.0.

According to one preferred embodiment of the present invention, the polypropylene composition (PP-C) comprising polypropylene (L-PP) and polypropylene (H-PP) has been visbroken with a visbreaking ratio [final $MFR_2$ (230° C.)/initial $MFR_2$ (230° C.)] of 10 to 50, wherein "final $MFR_2$ (230° C.)" is the $MFR_2$ (230° C.) of the polypropylene composition (PP-C) after visbreaking and "initial $MFR_2$ (230° C.)" is the $MFR_2$ (230° C.) of the polypropylene composition (PP-C) before visbreaking.

According to another preferred embodiment of the present invention, the polypropylene composition (PP-C) has a ratio of polydispersity index (PI) on [initial PI/final PI] of at least 1.3, wherein "final PI" is the polydispersity index (PI) of the polypropylene composition (PP-C) after visbreaking and "initial PI" is the polydispersity index (PI) of the polypropylene composition (PP-C) before visbreaking.

In the following the invention is described in more detail.

In a preferred embodiment the instant polypropylene composition (PP-C) comprises a high amount of a polypropylene (L-PP) homo- or copolymer having a melt flow rate according to ISO 1133 (230° C./2.16 kg) in the range of 0.1 g/10 min to 20 g/10 min and a small amount of a polypropylene (H-PP) homo- or copolymer having a melt flow rate according to ISO 1133 (230° C./2.16 kg) in the range of 300 g/10 min to 2,500 g/10 min. Furthermore, it has been discovered that the polypropylene composition (PP-C) should have a melt flow rate according to ISO 1133 (230° C./2.16 kg) in the range of 15 g/10 min to 60 g/10 min. A further finding is that the polypropylene composition (PP-C) should have a rather narrow molecular weight distribution. Thus, it is appreciated that the polypropylene composition (PP-C) comprises a) at least 80 wt.-%, like at least 85 wt.-%, based on the total weight of the polypropylene composition (PP-C), of a polypropylene (L-PP) homo- or copolymer having a melt flow rate according to ISO 1133 (230° C./2.16 kg) in the range of 0.1 g/10 min to 20 g/10 min and a comonomer content of up to 5 wt.-%, the comonomers are selected from ethylene and/or $C_4$- to $C_{10}$ α-olefin, and b) between 2 wt.-% and 20 wt.-%, like between 2 to 15 wt.-%, based on the total weight of the polypropylene composition (PP-C), of a polypropylene (H-PP) homo- or copolymer having a melt flow rate according to ISO 1133 (230° C./2.16 kg) in the range of 300 g/10 min to 2,500 g/10 min and a comonomer content of up to 5 wt.-%, the comonomers are selected from ethylene and/or $C_4$- to $C_{10}$ α-olefin, wherein the polypropylene composition (PP-C) has a melt flow rate according to ISO 1133 (230° C./2.16 kg) in the range of 15 g/10 min to 60 g/10 min and a polydispersity index (PI) of not more than 4.0, like not more than 3.8.

Unless otherwise indicated, throughout the instant invention the melt flow rate (230° C./2.16 kg) of the polypropylene (L-PP) and polypropylene (H-PP), respectively, is preferably the melt flow rate (230° C./2.16 kg) before visbreaking. Accordingly the melt flow rate (230° C./2.16 kg) of the polypropylene (L-PP) in the final polypropylene composition (PP-C), i.e. after visbreaking, is much higher, like around 35 g/10 min. The same holds true for the polypropylene (H-PP), but to less extent. In other words the degradation of the polypropylene (L-PP) is more pronounced due to much longer chain length compared the chain length of the polypropylene (H-PP).

Further, according to the present invention the term "polypropylene composition (PP-C)" indicates a composition which is extruded. More precisely the term "polypropylene composition (PP-C)" according to the present invention defines a composition which comprises the polypropylene (L-PP) and polypropylene (H-PP), wherein the two polymers are together extruded and are thereby preferably visbroken. In other words the term "polypropylene composition (PP-C)" stands for a melt blended composition which comprises the polypropylene (L-PP) and the polypropylene (H-PP) being (at least partially) visbroken. Accordingly the polypropylene composition (PP-C) according to this invention is preferably a visbroken material and in the form of pellets or granules In one preferred embodiment, the polypropylene composition (PP-C) comprises a) at least 85 wt.-%, of polypropylene (L-PP), and
b) between 3 wt.-% and 15 wt.-%, of polypropylene (H-PP), based on the total weight of the polypropylene composition (PP-C), preferably based on the total amount of the polypropylene (L-PP) and the polypropylene (H-PP) together.

For example, the polypropylene composition (PP-C) comprises a) between 90 wt.-% and 98 wt.-%, of polypropylene (L-PP), and
b) between 2 wt.-% and 10 wt.-%, based on the total weight of the polypropylene composition (PP-C), of polypropylene (H-PP), based on the total weight of the polypropylene composition (PP-C), preferably based on the total amount of the polypropylene (L-PP) and the polypropylene (H-PP) together.

The polypropylene composition (PP-C) of the present invention may comprise further components. However it is preferred that the inventive polypropylene composition (PP-C) comprises as polymer components only the polypropylenes (L-PP) and (H-PP) as defined in the instant invention. Accordingly, the amounts of polypropylenes (L-PP) and (H-PP) may not result in 100 wt.-% based on the total polypropylene composition (PP-C). Thus, the remaining part up to 100 wt.-% may be accomplished by further additives known in the art. However, this remaining part shall be not more than 3 wt.-%, like not more than 1.0 wt.-% within the total polypropylene composition. For instance, the inventive polypropylene composition (PP-C) may comprise additionally small amounts of additives selected from the group consisting of antioxidants, stabilizers, fillers, colorants, nucleating agents and antistatic agents. In general, they are incorporated during granulation of the pulverulent product obtained in the polymerization. Accordingly, the polypropylenes (L-PP) and (H-PP) constitute at least to 97 wt.-%, more preferably at least 99 wt.-% to the total polypropylene composition (PP-C). Primary and secondary antioxidants include, for example, hindered phenols, hindered amines, and phosphates. Nucleating agents include, for example, sodium benzoate, sorbitol derivatives like bis-(3, 4-dimethylbenzylidene)sorbitol and nonitol derivatives like 1,2,3-trideoxy-4,6:5,7-bis-O[(4-propylphenyl)methylene]-nonitol. Other additives such as dispersing and antistatic agents like glycerol monostearate can also be included. Slip agents include, for example, oleamide and erucamide. Catalyst deactivators are also commonly used, for example, calcium stearate, hydrotalcite, and calcium oxide, and/or other acid neutralizers known in the art.

A further mandatory requirement of the polypropylene composition (PP-C) is its rather low melt flow rate, which differ(s) from other polymers used for instance in the melt blown technique to produce fibers. Accordingly, it is preferred that in the present invention the polypropylene composition (PP-C) has a melt flow rate $MFR_2$ (230° C./2.16 kg) in the range of 10 g/10 min to 50 g/10 min. In one preferred embodiment of the present invention, the polypropylene composition (PP-C) has a melt flow rate $MFR_2$ (230° C./2.16 kg) in the range of 25 g/10 min to 40 g/10 min, more preferably in the range of 30 g/10 min to 40 g/10 min and most preferably in the range of 30 g/10 min to 35 g/10 min Unless otherwise indicated, throughout the present invention the melt flow rate $MFR_2$ (230° C./2.16 kg) of the polypropylene composition (PP-C) is the melt flow rate $MFR_2$ (230° C./2.16 kg) of the polypropylene composition (PP-C) after visbraking.

Furthermore, it is appreciated that the polypropylene composition (PP-C) according to this invention, i.e. after visbreaking, has a polydispersity index (PI) of not more than 4.0, preferably not more than 3.8, still more preferably of not more than 3.5. In one preferred embodiment of the present invention, the polypropylene composition (PP-C) has a polydispersity index (PI) in the range of 2.0 to 4.0, more preferably in the range of 2.0 to 3.8 and most preferably in the range of 2.5 to 3.0.

In one preferred embodiment the polypropylene composition (PP-C) has a melting temperature Tm of at least 155° C., more preferably in the range of 155 to 168° C., yet more preferably in the range of 158 to 166° C.

Furthermore, the polypropylene composition (PP-C) is preferably free of any elastomeric polymer component, like an ethylene propylene rubber. In other words, the polypropylene composition (PP-C) shall be not a heterophasic polypropylene composition, i.e. a system consisting of a polypropylene matrix in which an elastomeric phase is dispersed. Such systems are featured by a rather high xylene cold soluble content (XCS). Accordingly, the present polypropylene composition (PP-C) differs from such a heterophasic system by a rather low xylene cold soluble (XCS) content. Therefore, the polypropylene composition (PP-C) has preferably a xylene cold soluble fraction (XCS) of not more than 12 wt.-%, more preferably of not more than 10 wt.-% and most preferably of not more than 9.0 wt.-%. For example, the polypropylene composition (PP-C) has a xylene cold soluble fraction (XCS) of not more than 8.5 wt.-%, like in the range of 1 to 5 wt.-%.

As mentioned above. a further characteristic of the present polypropylene composition (PP-C) is that the polypropylene composition (PP-C) comprising polypropylene (L-PP) and polypropylene (H-PP) has been visbroken.

By visbreaking the polypropylene composition (PP-C) comprising polypropylene (L-PP) and polypropylene (H-PP) with heat or at more controlled conditions with peroxides, the molar mass distribution (MWD) becomes narrower because the long molecular chains are more easily broken up or scissored and the molar mass M, will decrease, corresponding to an $MFR_2$ increase. The $MFR_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert-.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of propylene homo- or copolymer to be subjected to visbreaking, the $MFR_2$ (230° C.) value of the propylene homo- or copolymer to be subjected to visbreaking and the desired target $MFR_2$ (230° C.) of the product to be obtained. Accordingly, typical amounts of peroxide visbreaking agent are from 0.005 to 0.5 wt.-%, more preferably from 0.01 to 0.2 wt.-%, based on the total amount of polymers in the polypropylene composition (PP-C), more preferably based on the total amount of polypropylenes (L-PP) and (H-PP) employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

As mentioned above, the inventive polypropylene composition (PP-C) is obtained by blending the single components of the polypropylene composition (PP-C), i.e. the polypropylene (L-PP) and polypropylene (H-PP), and visbreaking, preferably visbreaking due to the use of peroxide, the polymer components.

More precisely, the inventive polypropylene composition (PP-C) may be obtained by melt mixing polypropylene (L-PP) and polypropylene (H-PP), wherein in the same mixing step the visbreaking, preferably by use of peroxide as mentioned above, is accomplished.

More preferably the inventive polypropylene composition (PP-C) may be obtained by first dry blending the polypropylene (L-PP) and polypropylene (H-PP) and visbreaking said dry blend in a subsequent melt mixing step. Alternatively the inventive polypropylene composition (PP-C) may be obtained by first melt mixing the polypropylene (L-PP) and polypropylene (H-PP) without visbreaking (i.e. without peroxide) and visbreaking said mixture in a subsequent visbreaking step. In the latter case the melt mix of polypropylene (L-PP) and polypropylene (H-PP) or the granule form and pellet form, respectively, of said melt mix can be visbroken (preferably by use of peroxide as outlined above) in a subsequent step, i.e. in a subsequent extruding step.

After visbreaking the polypropylene composition (PP-C) according to this invention is preferably in the form of pellets or granules. The instant polypropylene composition (PP-C) is preferably used in pellet or granule form for the spunbonded fiber process.

Preferred mixing devices suited for this process are discontinuous and continuous kneaders, twin screw extruders and single screw extruders with special mixing sections and co-kneaders. The residence time must be chosen such that a sufficiently high degree of homogenization is achieved.

Preferably the polypropylene composition (PP-C) before visbreaking has a melt flow rate according to ISO 1133 (230° C./2.16 kg) in the range of 0.5 g/10 min to 35.0 g/10 min. In one preferred embodiment of the present invention, the melt blended polypropylene composition (PP-C) before vies-braking has a melt flow rate according to ISO 1133 (230° C./2.16 kg) in the range of 0.5 g/10 min to 25.0 g/10 min, more preferably in the range of 0.5 g/10 min to 15.0 g/10 min, even more preferable in the range of 0.5 g/10 min to 10.0 g/10 min and most preferably in the range of 0.5 g/10 min to 5.0 g/10 min. For example, the melt blended polypropylene composition (PP-C) has a melt flow rate according to ISO 1133 (230° C./2.16 kg) in the range of 1.0 g/10 min to 4.0 g/10 min It is appreciated that the polypropylene composition (PP-C) comprising polypropylene (L-PP) and polypropylene (H-PP) has a specific visbreaking ratio [final $MFR_2$ (230° C.)/initial $MFR_2$ (230° C.)], wherein "final $MFR_2$ (230° C.)" is the $MFR_2$ (230° C.) of the polypropylene composition (PP-C) after visbreaking and "initial $MFR_2$ (230° C.)" is the $MFR_2$ (230° C.) of the polypropylene composition (PP-C) before visbreaking. In one preferred embodiment of the present invention, the polypropylene composition (PP-C) comprising polypropylene (L-PP) and polypropylene (H-PP) has a visbreaking ratio [final $MFR_2$ (230° C.)/initial $MFR_2$ (230° C.)] of 9 to 50. For example, the polypropylene composition (PP-C) comprising polypropylene (L-PP) and polypropylene (H-PP) has a visbreaking ratio [final $MFR_2$ (230° C.)/initial $MFR_2$ (230° C.)] of 9 to 40, more preferably of 9 to 30 and most preferably of 9 to 20.

Alternatively or additionally, it should be noted that the polypropylene composition (PP-C) comprising polypropylene (L-PP) and polypropylene (H-PP) has a polydispersity index (PI) of more than 4 before visbreaking. In one preferred embodiment of the present invention, the polypropylene composition (PP-C) comprising polypropylene (L-PP) and polypropylene (H-PP) has before visbreaking a polydispersity index (PI) in the range of 4 to 5.5, more preferably in the range of 4.5 to 5.5 and most preferably in the range of 4.5 to 5.

Accordingly, the polypropylene composition (PP-C) comprising polypropylene (L-PP) and polypropylene (H-PP) has also a specific ratio of polydispersity index (PI) [initial PI/final PI], wherein "final PI" is the polydispersity index (PI) of the polypropylene composition (PP-C) after visbreaking and "initial pI" is the polydispersity index (PI) of the polypropylene composition (PP-C) before visbreaking. In one preferred embodiment of the present invention, the polypropylene composition (PP-C) comprising polypropylene (L-PP) and polypropylene (H-PP) has a ratio of polydispersity index (PI) [initial PI/final PI] of at least 1.3, more preferably of at least 1.4 and most preferably of at least 1.5. For example, the polypropylene composition (PP-C) comprising polypropylene (L-PP) and polypropylene (H-PP) has a ratio of polydispersity index (PI) [initial PI/final PI] between 1.2 and 2.5, more preferable between 1.3 and 2.0.

Due to the application of a visbreaking step by preferably using peroxide compounds, the polypropylene composition (PP-C) of the present invention preferably comprises an amount of peroxides and/or reaction products thereof of more than 50 ppm, more preferably of more than 100 ppm, even more preferably of more than 250 ppm, still more preferably in the range of 100 to 900 ppm, like in the range of 400 to 800 ppm, based on the total weight of the polypropylene composition (PP-C).

The inventive polypropylene composition (PP-C) is in particular further defined by its individual components.

One mandatory requirement is the presence of a polypropylene with a rather low melt flow rate $MFR_2$ (230° C.). Accordingly, the polypropylene composition (PP-C) shall comprise a polypropylene (L-PP) homo- or copolymer having a melt flow rate according to ISO 1133 (230° C./2.16 kg) in the range of 0.1 g/10 min to 20 g/10 min. Furthermore, the polypropylene (L-PP) is further defined by a comonomer content of up to 5 wt.-%, the comonomers are selected from ethylene and/or $C_4$- to $C_{10}$ α-olefin.

In one preferred embodiment of the present invention, the polypropylene (L-PP) is featured by a melt flow rate $MFR_2$ (230° C.) measured according to ISO 1133 in the range of 0.3 g/10 min to 15 g/10 min, more preferably in the range of 0.5 g/10 min to 10 g/10 min and yet more preferably in the range of 0.6 g/10 min to 8.0 g/10 min. For example, the polypropylene (L-PP) has a melt flow rate $MFR_2$ (230° C.) measured according to ISO 1133 in the range of 0.6 g/10 min to 5.0 g/10 min and most preferably in the range of 0.7 g/10 min to 3.0 g/10 min. The values refer to the polypropylene (L-PP) before visbreaking.

Further it is preferred that the polypropylene (L-PP) has a polydispersity index (PI) of at least more than 3.5, more preferably at least 4.0, yet more preferably in the range of more than 3.5 to 6.5. In one preferred embodiment of the present invention, the polypropylene (L-PP) has a polydispersity index (PI) in the range of 4.0 to 6.0. The values refer to the polypropylene (L-PP) before visbreaking.

A further characteristic of the polypropylene (L-PP) is its low xylene cold soluble content (XCS). Thus, it is preferred that the xylene cold soluble content (XCS) measured according ISO 6427 (23° C.) of the polypropylene (L-PP) is not more than 3.5 wt.-%, more preferably not more than 3.0 wt.-%, yet more preferably in the range of 0.1 to 3.5 wt.-%, still more preferably in the range of 0.5 to 3.0 wt.-%.

Additionally or alternatively, the polypropylene (L-PP) has a melting temperature Tm as determined by differential scanning calorimetry (DSC) of at least 150° C., more preferably of at least 155° C. and most preferably of at least 160° C. In one preferred embodiment, the polypropylene (L-PP) has a melting temperature Tm as determined by differential scanning calorimetry (DSC) between 150° C. and 170° C., more preferably between 155° C. and 165° C. and most preferably between 158° C. and 164° C. For example, the polypropylene (L-PP) has a melting temperature Tm as determined by differential scanning calorimetry (DSC) between 160° C. and 165° C.

The polypropylene (L-PP) can be a propylene homopolymer (HL-PP) and/or a random propylene copolymer (RL-PP). Preferably, the polypropylene (L-PP) is a propylene homopolymer (HL-PP).

The expression propylene homopolymer as used throughout the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

The propylene homopolymer (HL-PP) is preferably an isotactic propylene homopolymer. Accordingly, it is appreciated that the polypropylene matrix (HL-PP) has a rather high isotactic pentad concentration, i.e. higher than 90 mol-%, more preferably higher than 92 mol-%, still more preferably higher than 93 mol-% and yet more preferably higher than 95 mol-%, like higher than 97 mol-%.

Preferably the propylene homopolymer (HL-PP) has a melting temperature Tm measured according to ISO 11357-3 of at least 150° C., more preferably of at least 155° C. and most preferably of at least 160° C. In one preferred embodiment, the propylene homopolymer (HL-PP) has a melting temperature Tm as determined by differential scanning calorimetry (DSC) between 150° C. and 170° C., more preferably between 155° C. and 165° C. and most preferably between 158° C. and 164° C. For example, the propylene homopolymer (HL-PP) has a melting temperature Tm as determined by differential scanning calorimetry (DSC) between 160° C. and 165° C.

Propylene homopolymers (HL-PP) suitable in the inventive polypropylene composition (PP-C) are available from a wide variety of commercial sources and can be produced as known from the art.

If the polypropylene (L-PP) is a random propylene copolymer (RL-PP), the random propylene copolymer (RL-PP) preferably comprises, preferably consists of, units derived from
(i) propylene and
(ii) ethylene and/or $C_4$ to $C_{10}$ α-olefin.

Accordingly the random propylene copolymer (RL-PP) may comprise units derived from propylene, ethylene and/or α-olefin selected from the group consisting of $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably, the random propylene copolymer (RL-PP) comprises units derived from propylene, ethylene and/or α-olefin selected from the group consisting of 1-butene and 1-hexene are preferred. It is in particular preferred that the random propylene copolymer (RL-PP) consists of units derived from propylene and ethylene only.

Preferably, the units derivable from propylene constitutes the main part of the random propylene copolymer (RL-PP), i.e. at least 95 wt.-%, preferably of at least 97 wt.-%, more preferably of at least 98 wt.-%, still more preferably of 95 to 99.5 wt.-%, yet more preferably of 97 to 99.5 wt.-% and most preferably of 98 to 99.2 wt.-%, based on the total weight of the random propylene copolymer (RL-PP).

The amount of units derived from ethylene and/or $C_4$ to $C_{10}$ α-olefins other than propylene in the random propylene copolymer (RL-PP), is below 5 wt.-%, preferably in the range of 0.5 to 5 wt.-%, more preferably 0.5 to 3 wt.-% and most preferably 0.8 to 2 wt.-%, based on the total weight of the random propylene copolymer (RL-PP). It is in particular appreciated that the amount of ethylene in the random propylene copolymer (RL-PP), in particular in case the random propylene copolymer (RL-PP) comprises only units derivable from propylene and ethylene, is in the range of 0.5 to 5 wt.-% and preferably in the range of 0.8 to 2 wt.-%, based on the total weight of the random propylene copolymer (RL-PP).

Preferably, the random propylene copolymer (RL-PP) is isotactic. Accordingly, it is appreciated that the random propylene copolymer (RL-PP) has a rather high pentad concentration, i.e. higher than 95 mol-%, more preferably higher than 97 mol-%, still more preferably higher than 98 mol-%.

Further the units derived from ethylene and/or $C_4$ to $C_{10}$ α-olefin within the random propylene copolymer (RL-PP) are randomly distributed. The randomness indicates the amount of isolated comonomer units, i.e. those which have no other comonomer units in the neighborhood, compared to the total amount of comonomers in the polymer chain. In a preferred embodiment, the randomness of the random propylene copolymer (RL-PP) is at least 30%, more preferably at least 50%, even more preferably at least 60% and still more preferably at least 65%.

Additionally, it is appreciated that the random propylene copolymer (RL-PP) has a melting temperature Tm measured according to ISO 11357-3 of at least 150° C., more preferably of at least 152° C., like of at least 155° C. Accordingly, the melting temperature Tm ranges preferably from 150° C. to 165° C., more preferably from 150° C. to 163° C.

As further mandatory component within the polypropylene composition (PP-C) the polypropylene (H-PP) must be present. Contrary to the polypropylene (L-PP) the polypropylene (H-PP) must have a rather high melt flow rate $MFR_2$ (230° C.). Accordingly, it is appreciated that the polypropylene (H-PP) has a melt flow rate $MFR_2$ (230° C.) measured according to ISO 1133 in the range of 200 g/10 min to 2,500 g/10 min, more preferably in the range of 400 g/10 min to 2,000 g/10 min, even more preferably in the range of 800 g/10 min to 1,600 g/10 min. The values refer to the polypropylene (L-PP) before visbreaking.

Especially good results are achievable if the ratio of the melt flow rate between the polypropylene (H-PP) and polypropylene (L-PP) [$MFR_2$ (H-PP)/$MFR_2$ (L-PP)] is at least 10 and more preferably at least 20, wherein "$MFR_2$ (H-PP)" is the $MFR_2$ (230° C.) of the polypropylene (H-PP) before visbreaking and "$MFR_2$ (L-PP)" is the $MFR_2$ (230° C.) of the polypropylene (L-PP) before visbreaking. Furthermore, the melt flow rates $MFR_2$ (230° C.) are measured according to ISO 1133. In one preferred embodiment of the present invention, the ratio of the melt flow rate between the polypropylene (H-PP) and polypropylene (L-PP) [$MFR_2$ (H-PP)/$MFR_2$ (L-PP)] is in the range of 10 to 10,000, more preferably in the range of 20 to 1,500, wherein the melt flow rates $MFR_2$ (230° C.) are measured according to ISO 1133 before visbreaking.

The polypropylene (H-PP) is preferably a propylene homopolymer (HH-PP) and/or a random propylene copolymer (RH-PP). Preferably, the polypropylene (H-PP) is a propylene homopolymer (HH-PP).

It is thus appreciated that a preferred polypropylene composition (PP-C) of the present invention comprises a propylene homopolymer (HL-PP) and a propylene homopolymer (HH-PP).

In one preferred embodiment of the present invention, the polypropylene composition (PP-C) comprises a polypropylene homopolymer (HL-PP) having a melt flow rate according to ISO 1133 (230° C./2.16 kg) before visbreaking in the range of 0.1 g/10 min to 20 g/10 min and polypropylene homopolymer (HH-PP) having a melt flow rate according to ISO 1133 (230° C./2.16 kg) before visbreaking in the range of 200 g/10 min to 2,500 g/10 min.

In case the polypropylene (H-PP) is a propylene homopolymer (H-PP), said propylene homopolymer (H-PP) preferably has a xylene cold soluble content (XCS) measured according to ISO 6427 (23° C.) of not more than 3.5 wt.-%, more preferably of not more than 3.0 wt.-%, yet more preferably in the range of 0.1 to 3.5 wt.-%, still more preferably in the range of 0.5 to 3.0 wt.-%.

The propylene homopolymer (HH-PP) is preferably an isotactic propylene homopolymer. Accordingly, it is appreciated that the polypropylene matrix (HH-PP) has a rather high isotactic pentad concentration, i.e. higher than 90 mol-%, more preferably higher than 92 mol-%, still more preferably higher than 93 mol-% and yet more preferably higher than 95 mol-%, like higher than 97 mol-%.

Preferably the propylene homopolymer (HH-PP) has a melting temperature Tm measured according to ISO 11357-3 of at least 150° C., more preferably of at least 155° C. and most preferably of at least 160° C. In one preferred embodiment, the propylene homopolymer (HH-PP) has a melting temperature Tm as determined by differential scanning calorimetry (DSC) between 150° C. and 170° C., more preferably between 155° C. and 165° C. and most preferably between 158° C. and 164° C. For example, the propylene homopolymer (HH-PP) has a melting temperature Tm as determined by differential scanning calorimetry (DSC) between 160° C. and 165° C.

If the polypropylene (H-PP) is a random propylene copolymer (RH-PP), the random propylene copolymer (RH-PP) preferably comprises, preferably consists of, units derived from
(i) propylene and
(ii) ethylene and/or $C_4$ to $C_{10}$ α-olefin.

Accordingly the random propylene copolymer (RH-PP) may comprise units derived from propylene, ethylene and/or α-olefin selected from the group consisting of $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably, the random propylene copolymer (RH-PP) comprises units derived from propylene, ethylene and/or α-olefin selected from the group consisting of 1-butene and 1-hexene are preferred. It is in particular preferred that the random propylene copolymer (RH-PP) consists of units derived from propylene and ethylene only.

Preferably, the units derivable from propylene constitutes the main part of the random propylene copolymer (RH-PP), i.e. at least 95 wt.-%, preferably of at least 97 wt.-%, more preferably of at least 98 wt.-%, still more preferably of 95 to 99.5 wt.-%, yet more preferably of 97 to 99.5 wt.-% and most preferably of 98 to 99.2 wt.-%, based on the total weight of the random propylene copolymer (RH-PP).

The amount of units derived from ethylene and/or $C_4$ to $C_{10}$ α-olefins other than propylene in the random propylene copolymer (RH-PP), is below 5 wt.-%, preferably in the range of 0.5 to 5 wt.-%, more preferably 0.5 to 3 wt.-% and most preferably 0.8 to 2 wt.-%, based on the total weight of the random propylene copolymer (RH-PP). It is in particular appreciated that the amount of ethylene in the random propylene copolymer (RH-PP), in particular in case the random propylene copolymer (RH-PP) comprises only units derivable from propylene and ethylene, is in the range of 0.5 to 5 wt.-% and preferably in the range of 0.8 to 2 wt.-%, based on the total weight of the random propylene copolymer (RH-PP).

Preferably, the random propylene copolymer (RH-PP) is isotactic. Accordingly it is appreciated that the random propylene copolymer (RH-PP) has a rather high pentad concentration, i.e. higher than 95 mol-%, more preferably higher than 97 mol-%, still more preferably higher than 98 mol-%.

Further the units derived from ethylene and/or $C_4$ to $C_{10}$ α-olefin within the random propylene copolymer (RH-PP) are randomly distributed. The randomness indicates the amount of isolated comonomer units, i.e. those which have no other comonomer units in the neighborhood, compared to the total amount of comonomers in the polymer chain. In a preferred embodiment, the randomness of the random propylene copolymer (RH-PP) is at least 30%, more preferably at least 50%, even more preferably at least 60% and still more preferably at least 65%.

Additionally, it is appreciated that the random propylene copolymer (RH-PP) has a melting temperature Tm measured according to ISO 11357-3 of at least 150° C., more preferably of at least 152° C., like of at least 155° C. Accordingly, the melting temperature Tm ranges preferably from 150° C. to 165° C., more preferably from 150° C. to 163° C.

The polypropylenes (H-PP), like the propylene homopolymer (HH-PP), suitable in the inventive polypropylene composition (PP-C) are available from a wide variety of commercial sources. Its manufacture is known in the art.

As mentioned above, the individual components used for the inventive polypropylene composition (PP-C) can be readily produced by the information provided in the following.

Accordingly the polypropylene (L-PP) and the polypropylene (H-PP) can be produced by a single-site catalyst or a Ziegler-Natta catalyst, the latter being preferred.

The polymerization of the polypropylene (L-PP) and/or polypropylene (H-PP) can be a bulk polymerization, preferably performed in a so-called loop reactor. Alternatively, the polymerization of the polypropylene (L-PP) and/or polypropylene (H-PP) is a two stage or more stage polymerization performed in a combination of a loop reactor operating in slurry phase and one or more gas phase reactors as for instance applied in the Borstar® polypropylene process.

Preferably, in the process for producing the polypropylene (L-PP) and/or polypropylene (H-PP) as defined above the conditions for the bulk reactor of step may be as follows:
the temperature is within the range of 40° C. to 110° C., preferably between 60° C. and 100° C., 70 to 90° C.,
the pressure is within the range of 20 bar to 80 bar, preferably between 30 bar to 60 bar,
hydrogen can be added for controlling the molar mass in a manner known per se.

Subsequently, the reaction mixture from the bulk (bulk) reactor can be transferred to the gas phase reactor, whereby the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

As mentioned above, the polypropylene (L-PP) as well as the polypropylene (H-PP) are preferably obtained using a Ziegler-Natta system.

Accordingly the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane, diethyl-amino triethoxy silane or cyclohexyl methyldimethoxy silane.

One embodiment of a process for the polypropylene (L-PP) and/or polypropylene (H-PP), as discussed above, is a loop phase process or a loop-gas phase process, such as developed by *Borealis*, known as Borstar® technology, described for example in EP 0 887 379 A1 and WO 92/12182.

With respect to the above-mentioned preferred loop (slurry) phase process or preferred slurry-gas phase process, the following general information can be provided with respect to the process conditions.

The properties of the polypropylene (L-PP) and/or polypropylene (H-PP) produced with the above-outlined processes may be adjusted and controlled with the process conditions as known to the skilled person, for example by one or more of the following process parameters: temperature, hydrogen feed, propylene feed, catalyst, type and amount of external donor, split between two or more components of a multimodal polymer.

The above process descriptions for producing the polypropylene (L-PP) and/or polypropylene (H-PP) used in the present invention are equally applicable to polypropylene homopolymers (HH-PP and/or HL-PP) as well as polypropylene copolymers (RH-PP and/or RL-PP). One skilled in the art is aware of the various possibilities for preparing propylene homo- and copolymers and will simply find out a suitable process for preparing suitable polymers which can be used in the polypropylene composition (PP-C) of the present invention.

Furthermore, the present invention is also directed to polypropylene fibres (PP-F) made from the polypropylene composition (PP-C) as defined above. Thus, the present invention is in particular directed to polypropylene fibres (PP-F) having an average filament fineness of not more than 1.50 denier, like 0.3 to 1.50 denier. Furthermore, polypropylene fibres (PP-F) preferably comprise at least 95 wt.-% based on the total weight of the polypropylene fiber (PP-F), more preferably consist of, of a polypropylene composition (PP-C) as defined above.

In one preferred embodiment of the present invention, the polypropylene fibres (PP-F) have an average filament fineness of not more than 1.50 denier and more preferably of not more than 1.30 denier. Additionally or alternatively, the polypropylene fibres (PP-F) have an average filament fineness in the range of 0.6 denier to 1.50 denier, more preferably in the range 0.7 denier to 1.305 denier and most preferably in the range of 0.8 denier to 1.25 denier.

As stated above, one essential requirement of the inventive polypropylene fibre (PP-F) is that it is a spunbonded polypropylene fibre (PP-F). Spunbonded fibres differ essentially from other fibres, in particular from those produced by melt blown processes. Accordingly, the polypropylene fibres (PP-F) according to the present invention preferably have an (average) diameter measured of below 22 µm, more preferably of below 20 µm, even more preferably of below 16 µm. It is in particular appreciated that the (average) diameter of the polypropylene fibre (PP-F) is in the range of 8 to 22 µm, more preferably in the range of 10 to 20 µm, yet more preferably in the range of 10 to 16 µm.

The present invention is not only directed to the polypropylene fibre (PP-F) as such but also to spunbonded fabrics in the form of nonwoven fabrics comprising such polypropylene fibres (PP-F) and/or the polypropylene composition (PP-C) as defined above.

The present invention is further directed to articles, like webs, made from said polypropylene fibres (PP-F) and/or said spunbonded fabric. Accordingly, the present invention is directed to articles comprising the spunbonded fabric and/or the polypropylene fibres (PP-F) of the present invention, like filtration medium (filter), diaper, sanitary napkin, panty liner, incontinence product for adults, protective clothing, surgical drape, surgical gown, and surgical wear. The articles of the present invention may comprise in addition to the spunbonded fabric a melt blown web known in the art.

A particular aspect of the present invention refers to a process for the preparation of a spunbonded fabric, wherein the polypropylene composition (PP-C) as defined above has been spunbonded by using a fiber spinning line at a maximum cabin air pressure of at least 3,000 Pa. The spun bonding process is one which is well known in the art of fabric production. In general, continuous fibers are extruded, laid on an endless belt, and then bonded to each other, and often times to a second layer such as a melt blown layer, often by a heated calander roll, or addition of a binder, or by a mechanical bonding system (entanglement) using needles or hydro jets.

A typical spunbonded process consists of a continuous filament extrusion, followed by drawing, web formation by the use of some type of ejector, and bonding of the web. First, pellets or granules of the polypropylene composition (PP-C) as defined above are fed into an extruder. In the extruder, the pellets or granules are melted and forced through the system by a heating melting screw. At the end of the screw, a spinning pump meters the molten polymer through a filter to a spinneret where the molten polymer is extruded under pressure through capillaries, at a rate of 0.3 to 1.0 grams per hole per minute. The spinneret contains between 65 and 75 holes per cm, measuring 0.4 mm to 0.7 mm in diameter. The polypropylene composition (PP-C) is melted at about 30° C.-150° C. above its melting point to achieve sufficiently low melt viscosity for extrusion. The fibers exiting the spinneret are quenched and drawn into fine fibers measuring at most 15 microns in diameter by cold air jets, reaching filament speeds of at least 3800 m/min. The solidified fiber is laid randomly on a moving belt to form a random netlike structure known in the art as web. After web formation the web is bonded to achieve its final strength using a heated textile calander known in the art as thermobond calander. The calander consists of two heated steel rolls; one roll is plain and the other bears a pattern of raised points. The web is conveyed to the calander wherein a fabric is formed by pressing the web between the rolls at a bonding temperature of about 130° C.-150° C.

In view of the goods results achieved in the spunbonded process with respect to the processability and mechanical properties by utilizing the inventive polypropylene composition (PP-C), a further aspect of the present invention refers to the use of the polypropylene composition (PP-C) as defined above to improve the spinning stability of a fibre spinning line. Said spinning stability is expressed by the maximum cabin air pressure during the fibre spinning processing, wherein the improvement is defined by the Formula (I)

$$(PP\text{-}C)/(PP\text{-}OC) \geq 1.1 \qquad (I)$$

wherein (PP-C) is the maximum applicable cabin air pressure [Pa] of the polypropylene composition (PP-C) comprising polypropylene (L-PP) and polypropylene (H-PP), (PP-OC) is the maximum applicable cabin air pressure [Pa] of the polypropylene composition (PP-C) without the polypropylene (H-PP).

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Isotacticity in Polypropylene by $^{13}$C NMR Spectroscopy

The isotacticity is determined by quantitative $^{13}$C nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g. in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i.e. mmmm fraction of the pentad distribution.

Randomness

In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure —P-E-P— (one ethylene unit between propylene units), occurs at 733 cm$^{-1}$ This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C-NMR. (Thermochimica Acta, 66 (1990) 53-68).

Randomness=random ethylene (—P-E-P—) content/ the total ethylene content×100%.

Rheology: Dynamic rheological measurements were carried out with Rheometrics RDA-II QC on compression molded samples under nitrogen atmosphere at 200° C. using 25 mm—diameter plate and plate geometry. The oscillatory shear experiments were done within the linear viscoelastic range of strain at frequencies from 0.01 to 500 rad/s. (ISO 6721-10)

The values of storage modulus (G'), loss modulus (G"), complex modulus (G*) and complex viscosity (η*) were obtained as a function of frequency (ω).

The Zero shear viscosity (η$_0$) was calculated using complex fluidity defined as the reciprocal of complex viscosity. Its real and imaginary part are thus defined by $$f'(\omega) = \eta'(\omega)/[\eta'(\omega)^2 + \eta''(\omega)^2] \text{ and}$$

$$f''(\omega) = \eta''(\omega)/[\eta'(\omega)^2 + \eta''(\omega)^2]$$

From the following equations $$\eta' = G''/\omega \text{ and } \eta'' = G'/\omega$$

$$f'(\omega) = G''(\omega)*\omega/[G'(\omega)^2 + G''(\omega)^2]$$

$$f''(\omega) = G'(\omega)*\omega/[G'(\omega)^2 + G''(\omega)^2]$$

The Polydispersity Index, PI,

PI=10$^5$/Gc (Cross-over Modulus), is calculated from the cross-over point of G'(ω) and G"(ω), for which G'(ωc)=G"(ωc)=Gc (calculated in SI unit Pa) holds.

Density is measured according to ISO 1183-187. Sample preparation is done by compression molding in accordance with ISO 1872-2:2007

MFR$_2$ (230° C.) is measured according to ISO 1133 (230° C., 2.16 kg load).

Quantification of Comonomer Content by FTIR Spectroscopy

The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 cm$^{-1}$. Propylene-1-butene-copolymers were evaluated at 767 cm$^{-1}$. Quantitative results are obtained based upon reference to the film thickness.

Melting temperature T$_m$, crystallization temperature T$_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

The content of xylene cold solubles (XCS, wt.-%) was determined at 25° C. according ISO 16152; first edition; 2005-07-01.

Grammage of the Web

The unit weight (grammage) of the webs in g/m² was determined in accordance with EN 29073-1 (1992) "Test methods for nonwovens—Determination of mass per unit area"

Average Fiber Diameter in the Fabric

The average fibre diameter has been determined by using an optical microscope and measuring the diameter of 20 random selected fibres.

Filament Fineness

The filament fineness in denier has been calculated from the average fibre diameter by using the following correlation:

Fibre diameter(in cm)=$(4.444\times10^{-6}\times denier/0.91\times\pi)^{1/2}$

Mechanical Properties of the Web

The mechanical properties of the webs were determined in accordance with EN 29073-3 (1989), Test methods for nonwovens—Determination of tensile strength and elongation"

2. Preparation of the Examples
2.1 Preparation of the Polymers

Inventive Examples

L-PP polymers with different MFRs and a XCS content of about 3 wt.-% have been polymerized in a Spheripol process by using the Ziegler-Natta M1 catalyst, a commercial 4$^{th}$ generation Ziegler-Natta catalyst from Lyondell-Basell. The typical melting point of these polymers is 161° C. These polymers have been mixed with 400 ppm Calcium Stearate, 1000 ppm Irgafos 168 and 400 ppm Irganox 3114 and an amount of H-PP as mentioned in the table. As H-PP, HL512 FB has been used. HL512FB is a commercial grade form *Borealis* having a MFR of 1,200 g/10 min and a melting temperature of 158° C.

In a second step these mixtures have been visbroken by using a co-rotating twin-screw extruder at 200-230° C. and using an appropriate amount of (tert.butylperoxy)-2,5-dimethylhexane (Trigonox 101, distributed by Akzo Nobel, Netherlands) to achieve the target MFR as mentioned in the table 1. By using a dynamic rheometer the polydispersity index has been determined at a temperature of 200° C. for all samples produced.

Comparative Example (CE1)

The commercial polypropylene homopolymer HG455FB (*Borealis*) having an MFR$_2$ of 27 g/10 min produced in a visbreaking process was used as comparative example. This polymer is characterized by a melting temperature of 161° C. and a polydispersity index of 2.7, determined at a temperature of 200° C. by using a dynamic rheometer.

The details for inventive examples IE1, IE2 and IE3 and comparative example CE1 are summarized in Table 1.

TABLE 1

| Sample | L-PP MFR | L-PP [wt.-%] | H-PP [wt.-%] | Final MFR$_2$ [g/10 min] | Final PI [—] |
|---|---|---|---|---|---|
| IE1 | 2 | 95 | 5 | 34 | 2.7 |
| IE2 | 0.8 | 95 | 5 | 25 | 2.7 |
| IE3 | 2 | 95 | 5 | 25 | 3.5 |
| CE1 | 27 | 100 | 0 | 27 | 2.7 |

2.2 Preparation of Polypropylene Fibers and Spunbonded Fabrics

The polypropylene compositions have been converted into spunbonded fabrics on a Reicofil 4 line using a spinneret having 7377 holes of 0.6 mm exit diameter and 6827 holes per meter. The gap of the pre-diffuser exit has a diameter of 23 mm, while the SAS gap exit has a diameter of 20 mm. The temperature of the outlet roll was set to 100° C. and the die temperature to 260° C. The throughput per hole has been kept constant at 0.49 g/(min*hole), at a throughput per meter of 200.5 kg/(h*m) and a total throughput of 216.7 kg/h. The line speed was set to 330 m/min and the fabrics produced had a weight of 10 g/m².

Table 2 summarizes data regarding filament fineness, processability and mechanical properties with respect to inventive examples IE1, IE2, IE3 and CE1.

TABLE 2

| Grade | Max Cabin pressure (Pa) | Spinning stability | Filament fineness (den) | Filament speed (m/min) | Max MD tensile strength (N) | Max CD tensile strength (N) | Elongation MD (%) | Elongation CD (%) | Remark spinning stability |
|---|---|---|---|---|---|---|---|---|---|
| IE1 | 10000 | ++++ | 1.1 | 4006 | 34.0 | 15.8 | 68.1 | 75.4 | stable |
| IE2 | 10000 | +++ | 1.1 | 4006 | 35.4 | 16.5 | 59.8 | 71.2 | Some drops |
| IE3 | 9000 | ++ | 1.15 | 3832 | 31.6 | 16.3 | 69.2 | 87.2 | Some drops |
| CE1 | 8000 | + | 1.2 | 3670 | 30.1 | 14.1 | 66.9 | 72.7 | stable |

From the results obtained, it can be gathered that CE1 can be run at a maximum cabin pressure of 8000 Pa. At this condition the filament titre is 1.2 denier. IE2 is clearly better regarding the filament fineness of 1.1 denier which can be obtained at a maximum cabin air pressure of 10,000. The best spinning stability, however, is observed for IE1. It can be run at a maximum cabin air pressure of 10,000 Pa at stable conditions. In addition thereto, it should be noted that IE1, IE2 and IE3 show improved mechanical properties compared to the standard CE1.

The invention claimed is:

1. A polypropylene composition (PP-C) comprising:
   a) at least 80 wt. %, based on the total weight of the polypropylene composition (PP-C), of a polypropylene (L-PP) homo- or copolymer having a melt flow rate according to ISO 1133 (230° C./2.16 kg) in the range of 0.6 g/10 min to 5 g/10 min and a comonomer content of up to 5 wt. %, the comonomers are selected from ethylene and/or C$_4$- to C$_{10}$ α-olefin, and
   b) between 2 wt. % and 20 wt. %, based on the total weight of the polypropylene composition (PP-C), of a polypropylene (H-PP) homo- or copolymer having a melt flow rate according to ISO 1133 (230° C./2.16 kg) in the range of 800 g/10 min to 1,600 g/10 min and a comonomer content of up to 5 wt. %, the comonomers are selected from ethylene and/or C$_4$- to C$_{10}$ α-olefin,
   wherein the polypropylene composition (PP-C) comprising polypropylene (L-PP) and polypropylene (H-PP)

has been visbroken with a visbreaking ratio [final MFR2 (230° C.)/initial MFR2 (230° C.)] of 9 to 50, wherein "final MFR2 (230° C.)" is the MFR2 (230° C.) of the polypropylene composition (PP-C) after visbreaking and "initial MFR2 (230° C.)" is the MFR2 (230° C.) of the polypropylene composition (PP-C) before visbreaking, and wherein the polypropylene composition (PP-C) has a final melt flow rate according to ISO 1133 (230° C./2.16 kg) in the range of 10 g/10 min to 60 g/10 min and a final polydispersity index (PI) of not more than 4.0.

2. The polypropylene composition (PP-C) according to claim 1, wherein the polypropylene (L-PP) has:
   a) a melt flow rate according to ISO 1133 (230° C./2.16 kg) in the range of 0.7 g/10 min to 3.0 g/10 min, and/or
   b) a melting temperature Tm measured according to ISO 11357-3 of at least 150° C., and/or
   c) a xylene cold soluble content (XCS) measured according to ISO 6427 (23° C.) of not more than 3.5 wt. %.

3. The polypropylene composition (PP-C) according to claim 1, wherein the polypropylene (H-PP) has:
   a xylene cold soluble content (XCS) measured according to ISO 6427 (23° C.) of not more than 3.5 wt. %.

4. The polypropylene composition (PP-C) according to any one of claim 1, wherein:
   a) the polypropylene (L-PP) is a propylene homopolymer (HL-PP), and/or
   b) the polypropylene (H-PP) is a propylene homopolymer (HH-PP).

5. The polypropylene composition (PP-C) according to claim 1, wherein the polypropylene composition (PP-C) comprises:
   a) at least 90 wt. % of polypropylene (L-PP), and
   b) between 3 wt. % and 10 wt. % of polypropylene (H-PP), based on the total weight of the polypropylene composition (PP-C), optionally based on the total amount of the polypropylene (L-PP) and the polypropylene (H-PP) together.

6. The polypropylene composition (PP-C) according to claim 1, wherein the polypropylene composition (PP-C) has:
   a) a final melt flow rate according to ISO 1133 (230° C./2.16 kg) in the range of 25 g/10 min to 40 g/10 min, and/or
   b) a final polydispersity index (PI) in the range of 2.0 to 4.0.

7. The polypropylene composition (PP-C) according to claim 1, wherein the polypropylene composition (PP-C) has a ratio of polydispersity index (PI) [initial PI/final PI] of at least 1.3, wherein "final PI" is the polydispersity index (PI) of the polypropylene composition (PP-C) after visbreaking and "initial PI" is the polydispersity index (PI) of the polypropylene composition (PP-C) before visbreaking.

8. Polypropylene fiber (PP-F) having an average filament fineness of not more than 1.50 denier, wherein said fiber (PP-F) comprises at least 95 wt. %, based on the total weight of the polypropylene fiber (PP-F), of a polypropylene composition (PP-C) as defined in claim 1.

9. The polypropylene fibers (PP-F) according to claim 8 being spunbound into a fabric.

10. The polypropylene fibre (PP-F) according to claim 8 being provided in an article is selected from the group consisting of filtration medium, diaper, sanitary napkin, panty liner, incontinence product for adults, protective clothing, surgical drape, surgical gown, and surgical wear.

11. Process for the preparation of a spunbonded fabric comprising: spunbonding a polypropylene composition (PP-C) by using a fibre spinning line at a maximum cabin air pressure of at least 3,000 Pa, wherein the polypropylene composition (PP-C) includes:
   a) at least 80 wt. %, based on the total weight of the polypropylene composition (PP-C), of a polypropylene (L-PP) homo- or copolymer having a melt flow rate according to ISO 1133 (230° C/2.16 kg) in the range of 0.6 g/10 min to 5 g/10 min and a comonomer content of up to 5 wt. %, the comonomers are selected from ethylene and/or $C_4$- to $C_{10}$ α-olefin, and
   b) between 2 wt. % and 20 wt. %, based on the total weight of the polypropylene composition (PP-C), of a polypropylene (H-PP) homo- or copolymer having a melt flow rate according to ISO 1133 (230° C/2.16 kg) in the range of 800 g/10 min to 1,600 g/10 min and a comonomer content of up to 5 wt. %, the comonomers are selected from ethylene and/or $C_4$- to $C_{10}$ α-olefin,
   visbreaking the polypropylene composition (PP-C) comprising polypropylene (L-PP) and polypropylene (H-PP) with a visbreaking ratio [final MFR2 (230° C.)/initial MFR2 (230° C.)] of 9 to 50, wherein "final MFR2 (230° C.)" is the MFR2 (230° C.) of the polypropylene composition (PP-C) after visbreaking and "initial MFR2 (230° C.)" is the MFR2 (230° C.) of the polypropylene composition (PP-C) before visbreaking, and
   wherein the polypropylene composition (PP-C) has a final melt flow rate according to ISO 1133 (230° C/2.16 kg) in the range of 10 g/10 min to 60 g/10 min and a final polydispersity index (PI) of not more than 4.0.

12. The process according to claim 11, wherein the fibre spinning line comprises the following steps of:
   a) feeding the polypropylene composition (PP-C) into an extruder to melt the polypropylene composition (PP-C),
   b) forcing the molten polypropylene composition (PP-C) through a spinneret having holes of 0.4 mm to 0.7 mm diameter and 65 to 75 holes per cm at a rate of 0.3 g to 1 g per hole per meter to form polypropylene fibres (PP-F), and
   c) quenching and drawing the polypropylene fibers (PP-F) at filament speeds of at least 3800 m/min.

\* \* \* \* \*